(12) United States Patent
Takata et al.

(10) Patent No.: US 7,197,698 B2
(45) Date of Patent: Mar. 27, 2007

(54) INFORMATION PROCESSING METHOD AND APPARATUS

(75) Inventors: Tomomi Takata, Ohta-ku (JP); Hidetomo Sohmai, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 425 days.

(21) Appl. No.: 10/758,625

(22) Filed: Jan. 14, 2004

(65) Prior Publication Data

US 2004/0148564 A1    Jul. 29, 2004

(30) Foreign Application Priority Data

Jan. 21, 2003   (JP)   ............................. 2003-012512
Jan. 21, 2003   (JP)   ............................. 2003-012513

(51) Int. Cl.
*G06F 17/00*   (2006.01)

(52) U.S. Cl. .................................... 715/512; 715/500.1
(58) Field of Classification Search ................ 715/500, 715/512, 500.1
See application file for complete search history.

(56) References Cited

U.S. PATENT DOCUMENTS

| 5,493,677 | A | * | 2/1996 | Balogh et al. ........... 707/104.1 |
| 6,591,265 | B1 | * | 7/2003 | Erickson et al. ................ 707/9 |
| 6,760,734 | B1 | * | 7/2004 | Stephens ..................... 707/102 |
| 6,792,047 | B1 | * | 9/2004 | Bixby et al. ........... 375/240.26 |
| 7,107,520 | B2 | * | 9/2006 | Gargi ........................... 715/512 |
| 2002/0069218 | A1 | * | 6/2002 | Sull et al. ................ 707/501.1 |
| 2002/0159640 | A1 | * | 10/2002 | Vaithilingam et al. ...... 382/218 |
| 2003/0051113 | A1 | * | 3/2003 | Beardsley et al. .......... 711/163 |
| 2003/0135765 | A1 | * | 7/2003 | Hind et al. .................. 713/202 |
| 2003/0217031 | A1 | * | 11/2003 | Owen et al. .................... 707/1 |
| 2004/0003013 | A1 | * | 1/2004 | Coulthard et al. .......... 707/205 |
| 2004/0098362 | A1 | * | 5/2004 | Gargi ............................. 707/1 |
| 2004/0123109 | A1 | * | 6/2004 | Choi ........................... 713/176 |
| 2005/0262103 | A1 | * | 11/2005 | Stakutis et al. ............... 707/10 |

* cited by examiner

*Primary Examiner*—Stephen Hong
*Assistant Examiner*—Adam Queler
(74) *Attorney, Agent, or Firm*—Canon USA, Inc. Intellectual Property Division (57) ABSTRACT

An information processing method according to the present invention for editing multimedia content including metadata includes a receiving step and a determining step. In the receiving step, operation information about an editing operation is received. In the determining step, it is determined whether or not the metadata is usable for the edited multimedia content in accordance with the operation information and a property of the metadata in which a change in the reliability of the metadata due to the editing operation is written.

9 Claims, 10 Drawing Sheets

```
3-a : <Metadata>
3-b :     <Segment StartTime="00 : 02 : 12", EndTime="00 : 04 : 34">
3-c :         <DominantColor>
3-d :             <Metameta>
3-e :                 <Operation name="ColorChange", Reliability="30%"/>
3-f :                 <Operation name="VideoEdit", Reliability="0%"/>
3-g :             </Metameta>
3-h :             <RGB R=#20, G=#30, B=#40/>
3-i :         </DominantColor>
3-j :         <Dialog>
3-k :             <Metameta>
3-l :                 <Operation name="AudioChange", Reliability="0%"/>
3-m :             </Metameta>
3-n :             <Element Voice="Hello"/>
3-o :         </Dialog>
3-p :         <Semantics>
3-q :             <Metameta>
3-r :                 <Operation name="*", Reliability="100%"/>
3-s :             </Metameta>
3-t :             <agent>
3-u :                 <person name="Suzuki Ichiro"/>
3-v :             </agent>
3-w :         </Semantics>
3-x :     </Segment>
3-y : </Metadata>
```

| NAME OF EDITING AND EFFECT | METADATA OF DOMINANT COLOR (DominantColor) | METADATA OF DIALOG (Dialog) | METADATA OF PHOTOGRAPHED OBJECT (Semantics) |
|---|---|---|---|
| SEPIA PROCESSING | REDUCE (KEEP) | SAME (KEEP) | SAME (KEEP) |
| POST-RECORDING PROCESSING | SAME (KEEP) | UNRELIABLE (DO NOT KEEP) | SAME (KEEP) |

FIG. 7

```
7-a :  <Metadata>
7-b :      <Segment StartTime="00 : 02 : 12", EndTime="00 : 04 : 34">
7-c :          <DominantColor>
7-d :              <Metameta>
7-e :                  <OperationReliability URL="http://www.foo.bar/DC.xml"/>
7-f :              </Metameta>
7-g :              <RGB R=#20, G=#30, B=#40/>
7-h :          </DominantColor>
7-i :          <Dialog>
7-j :              <Metameta>
7-k :                  <OperationReliability URL="http://www.foo.bar/DL.xml"/>
7-l :              </Metameta>
7-m :              <Element Voice="Hello"/>
7-n :          </Dialog>
7-o :          <Semantics>
7-p :              <Metameta>
7-q :                  <OperationReliability URL="http://www.foo.bar/SM.xml"/>
7-r :              </Metameta>
7-s :              <agent>
7-t :                  <person name="Suzuki Ichiro"/>
7-u :              </agent>
7-v :          </Semantics>
7-w :      </Segment>
7-x :  </Metadata>
```

FIG. 8

```
4-a : <Metadata>
4-b :     <Segment StartTime="00 : 02 : 12", Endtime="00 : 04 : 34">
4-c :         <DominantColor>
4-d :             <Metameta>
4-e :                 <Operation name="ColorChange", Reliability="30%"/>
4-f :                 <Operation name="VideoEdit",Reliability="0%"/>
4-g :                 <OperationRecord name="ColorChange"/>
4-h :             </Metameta>
4-i :             <RGB R=#20, G=#30, B=#40/>
4-j :         </DominantColor>
4-k :         <Dialog>
4-l :             <Metameta>
4-m :                 <Operation name="AudioChange", Reliability="0%"/>
4-n :                 <OperationRecord name="AudioChange"/>
4-o :             </Metameta>
4-p :             <Element Voice="Hello"/>
4-q :         </Dialog>
4-r :         <Semantics>
4-s :             <Metameta>
4-t :                 <Operation name="*", Reliability="100%"/>
4-u :             </Metameta>
4-v :             <agent name="Suzuki Ichiro"/>
4-w :         </Semantics>
4-x :     </Segment>
4-y : </Metadata>
```

INFORMATION PROCESSING METHOD AND APPARATUS

BACKGROUND OF THE INVENTION

1. Field of the Invention

The present invention relates to information processing technologies for performing various types of processing on multimedia content.

2. Description of the Related Art

In recent years, high-quality content made of images, audio, and the like and supplied as digital data has been supplied, and multimedia content including the mixed content has been circulated. In particular, due to the widespread use of the Internet, which is a global-scale network, in the past few years, such content can be easily available for pleasure.

Furthermore, due to development in infrastructures for circulation and transmission of information, even individuals can transmit information. Also, transmission of various types of multimedia content including moving images, audio, and the like is becoming possible. In order to create such content, for example, technologies for easily editing and processing moving images photographed with video cameras are required.

In order to easily edit and process moving image data, audio data, and the like without troubling users, computers are required to automatically recognize content. However, it is naturally very difficult for computers to automatically recognize the details of information, such as moving images having a large amount of information that change over time.

For document data or the like, which is one type of digital data, it is not difficult for computers to determine a part including a designated character or word. However, it is technologically very difficult for computers to understand the details expressed using moving images, audio, and the like.

Thus, in order to easily recognize such multimedia content made of moving images, still images, audio, and the like, a method for providing, as metadata, linguistic information including the details and features of the multimedia content described using a keyword, an explanatory note, or the like or non-linguistic information including the features of the multimedia content described using an image or audio in a format that is easily processed by computers is adopted. Also, compatibility of the format of metadata itself is being achieved by means of MPEG-7 or the like.

In other words, in order to easily perform retrieval, editing, and the like on enlarged multimedia content, instead of understanding the details of the large content, the features and characteristics of the multimedia content are held inside or outside the content as metadata, and such information is used to realize a function to easily edit multimedia content.

A central processing apparatus determining the details of content in accordance with the property and conditions by using an object (data) and a property (metadata) in order to perform load distribution in a case where an object-oriented data management system is used is disclosed as an example. The processing apparatus is capable of instructing appropriate processing to an appropriate processing part.

However, using metadata in editing multimedia content, as described above, causes the problems described below.

First, since a wide variety of metadata exists, all the information processing apparatuses cannot recognize metadata when editing multimedia content. Thus, if editing is performed on multimedia content without recognizing metadata, the metadata is not copied to the edited multimedia content. Consequently, metadata cannot be used for edited multimedia content.

Second, even if information processing apparatuses can recognize metadata when editing multimedia content, in a case where the multimedia content is changed in accordance with the editing, the metadata is inappropriate as metadata indicating a property of the changed multimedia content. Thus, the metadata cannot be correctly used for the edited multimedia content.

In other words, the known technologies described above cause a problem in that metadata cannot be correctly used due to editing of multimedia content.

SUMMARY OF THE INVENTION

The present invention is designed in consideration of the above-mentioned problems, and the object of the present invention is to be capable of correctly using metadata even for edited multimedia content, irrespective of types of metadata.

An information processing method according to the present invention for editing multimedia content including metadata includes a receiving step and a determining step. In the receiving step, operation information about an editing operation is received. In the determining step, it is determined whether or not the metadata is usable for the edited multimedia content in accordance with the operation information and a property of the metadata in which a change in the reliability of the metadata due to the editing operation is written.

Further objects, features and advantages of the present invention will become apparent from the following description of the preferred embodiments with reference to the attached drawings.

BRIEF DESCRIPTION OF THE DRAWINGS

FIG. 2 shows an example of a state in which the information processing apparatus according to the first embodiment reads a computer program, data, and the like from a medium storing the computer program and the like.

DESCRIPTION OF THE PREFERRED EMBODIMENTS

An overview of the present invention will first be described.

According to the present invention, metadata is provided to content, such as a moving image, and at the same time, a property of the metadata, in other words, the property indicating the extent of reduction in the reliability of the metadata when an operation such as editing is performed on the content is provided as meta-metadata. Both the metadata and meta-metadata can be used in each apparatus together.

As a result of this, each piece of content includes meta-metadata, which is a redundant part. However, if the content is edited and processed, use of information of the meta-metadata enables each apparatus to determine whether or not the metadata is usable for the edited and processed content.

If the metadata is determined to be unusable, the unusable metadata is prevented from being copied to the edited and processed content. Accordingly, unusable metadata is prevented from being added to content. Since this determination is performed on the basis of meta-metadata, even an apparatus that cannot recognize the details of metadata can perform such determination. Furthermore, since such determination processing is performed in each apparatus, the processing operation can be decentralized. In other words, processing for metadata is determined in accordance with meta-metadata for the metadata in decentralized processing apparatuses.

Also, the use of information of meta-metadata enables calculation of the reliability of metadata in edited content.

As a result of this, for example, in a case where metadata is used for retrieval in content, in accordance with calculated reliability, metadata with low reliability is determined to be unusable and is excluded from the retrieved results. Accordingly, more accurate use of metadata can be achieved.

Embodiments of the present invention will now be described with reference to the drawings.

First Embodiment

Figure 1:
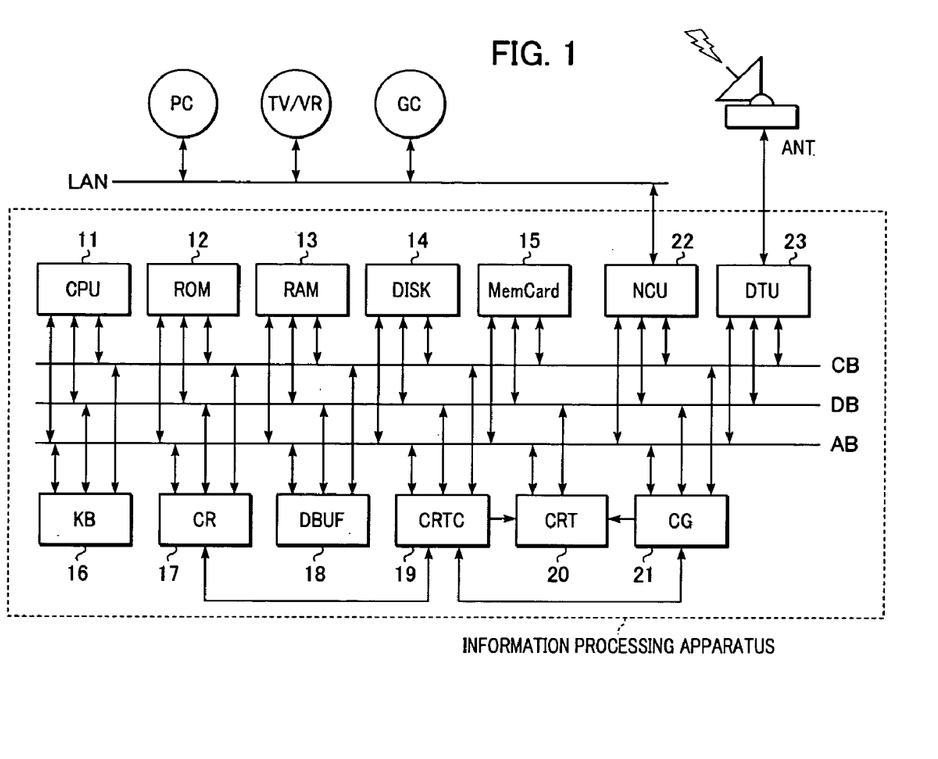
FIG. 1 is a block diagram showing the entire structure of an information processing system including an information processing apparatus according to a first embodiment of the present invention.

FIG. 1 shows an example of the entire structure of an information processing system including an information processing apparatus according to a first embodiment of the present invention.

Referring to FIG. 1, a microprocessor (CPU) 11 performs calculation, logical determination, and the like for various types of processing. The CPU 11 also controls, via an address bus AB, a control bus CB, and a data bus DB, components connected to each of the buses. The operations of the CPU 11 are instructed by programs stored on a ROM 12 and a RAM 13. Also, a function of the CPU 11 itself and mechanisms of computer programs enable a plurality of computer programs to be operated in parallel.

The address bus AB transfers an address signal instructing a component to be controlled by the CPU 11. The control bus CB transfers and applies a control signal for each component to be controlled by the CPU 11. The data bus DB performs data transfer between components.

The ROM 12 is a read-only permanent memory and stores a control program such as a processing program executed in the first embodiment. The ROM 12 also stores a computer program area and a data area in which procedures for control by the CPU 11 are stored.

The RAM 13 is a writable random access memory. The RAM 13 is used as a computer program area and a data area in which procedures for control by the CPU 11 are stored and is also used as a temporary storage area for various computer programs and various types of data from each component other than the CPU 11.

Storage media, such as the ROM 12 and the RAM 13, store a computer program, data, and the like for realizing the first embodiment. The function of the first embodiment can be realized by reading and executing, by the system or a computer of the apparatus, program codes stored in these storage media.

Also, there is a possibility that a recording medium storing the program and the data according to the present invention is supplied to the system or the apparatus and that the program is copied from the recording medium to a rewritable storage medium, such as the RAM 13. The recording medium may be a CD-ROM, a floppy disk, a hard disk, a memory card, a magnetic optical disk, or the like. The present invention can be realized by using any such recording medium.

Figure 2:
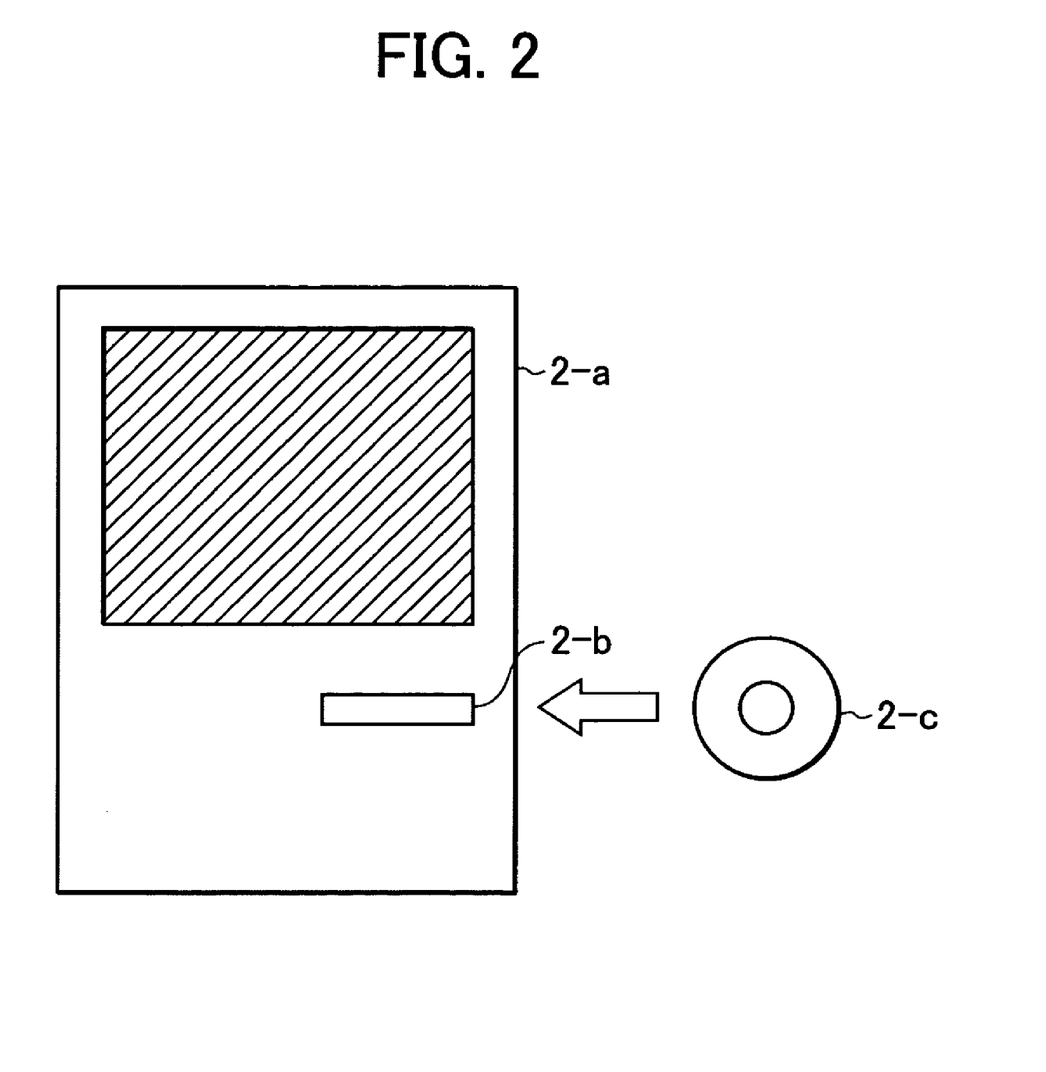

Referring to an example shown in FIG. 2, a computer program for realizing the first embodiment can be read from a recording medium 2-c which stores the computer program, where the recording medium 2-c storing the computer program is also included in the first embodiment. In FIG. 2, an apparatus 2-a, which is also shown in FIG. 1 as the information processing apparatus, includes a driver 2-b for reading the recording medium.

Referring back to FIG. 1, a hard disk (DISK) 14 functions as an external memory for storing various computer programs, various types of data, and the like. The DISK 14 contains a storage medium capable of reading and writing a large amount of information at relatively high speed, so that the DISK 14 can store and retrieve the various computer programs, the various types of data, and the like as necessary. Also, the stored computer programs and data can be called up completely or partially on the RAM 13 as necessary in accordance with an instruction from a keyboard or from various types of computer programs.

A memory card (MemCard) 15 is a detachable storage medium. Storing information into the MemCard 15 and connecting the MemCard 15 to another apparatus causes the stored information to be referred to and transferred.

A keyboard (KB) 16 includes various function keys, such as alphabet keys, hiragana keys, katakana keys, character symbol input keys for inputting a period and the like, cursor movement keys for instructing cursor movement, and the like. The KB 16 may be provided with a pointing device, such as a mouse.

The details of a cursor register (CR) 17 is read and written by the CPU 11. A CRT controller (CRTC) 19 displays a cursor in a position on a display device (CRT) 20 corresponding to an address stored in the CR 17.

A display buffer memory (DBUF) 18 stores a pattern of data to be displayed.

The CRTC 19 functions to display the details stored in the DBUF 18 on the CRT 20.

The CRT 20 is formed by a cathode ray tube or the like. A dot display pattern and cursor display on the CRT 20 is controlled by the CRTC 19.

A character generator (CG) 21 stores patterns of characters and symbols to be displayed on the CRT 20.

A communication device (NCU) 22 communicates with another computer apparatus or the like. Use of the NCU 22 enables programs and data according to the first embodiment to be shared with the other computer apparatus. Referring to FIG. 1, the NCU 22 is connected to a personal computer (PC), a receiving, storing, and displaying apparatus (TV/VR) for receiving, storing, and displaying a television broadcast and an image photographed by a user, a game computer (GC) for home use, and the like via a network (LAN) for free information exchange. Needless to say, any apparatus can be connected to the apparatus according to the present invention via the network. Any type of network can be used. The network is not necessarily closed as shown in FIG. 1. The network may be connected externally.

A receiving device (DTU) 23 realizes a receiving function of broadcast communication using a satellite or the like. The DTU 23 has a function to receive, by a parabolic antenna (ANT), radio waves and the like broadcast via the satellite in order to retrieve data being broadcast. Any types of satellite communication, such as broadcasting using ground waves, broadcasting using a coaxial cable or an optical cable, and distributing using the LAN or a large scale network, can be adopted.

The information processing apparatus according to the first embodiment with the arrangement described above realizes a function to edit and process multimedia content, such as a moving image, a still image, and the like, and to perform an operation on metadata for the multimedia content. To begin with, the content and the metadata for the content are normally stored in a storage device, such as the DISK 14 or the MemCard 15 shown in FIG. 1, or in an external storage device via the NCU 22 and the DTU 23 shown in FIG. 1. The content may be a moving image or a still image and may be recorded in any type of format. Similarly, metadata may be written in any format and recorded in any format as long as information (meta-metadata) according to the present invention is included.

Figure 3:
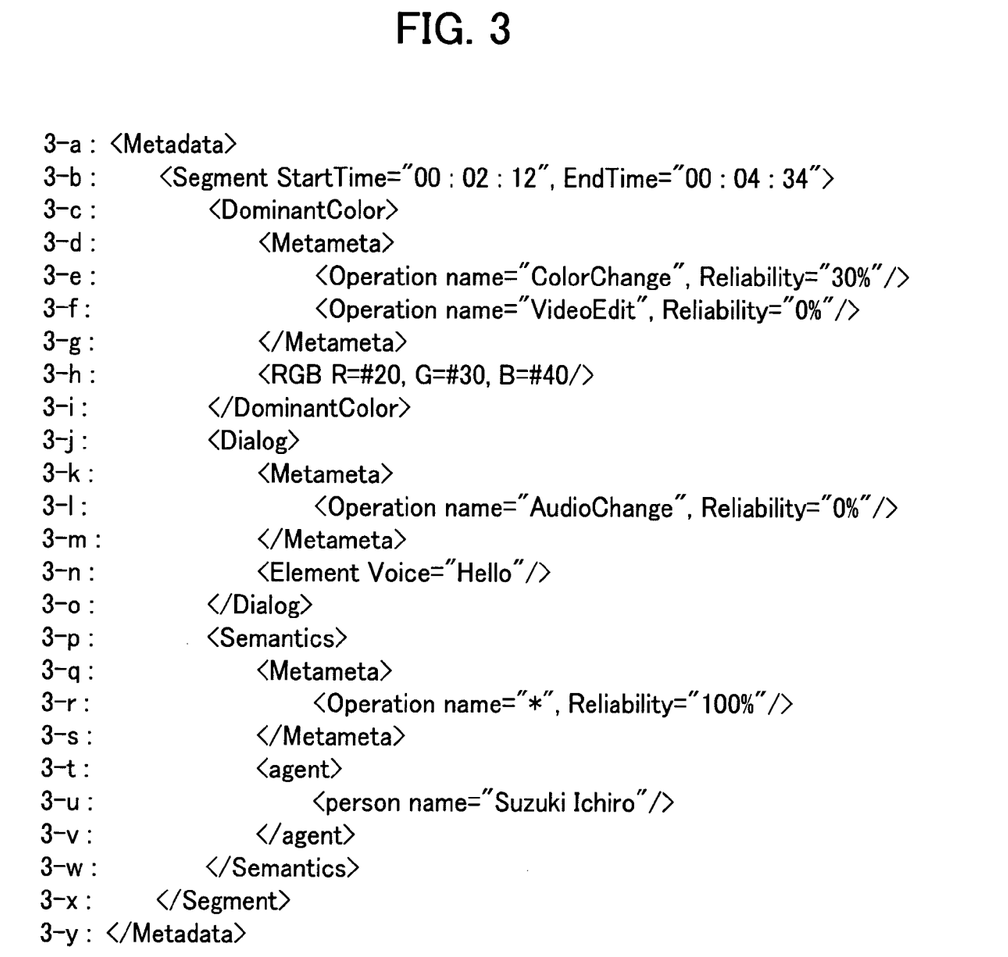
FIG. 3 shows data written in XML, which is an example of metadata and meta-metadata used in the information processing apparatus according to the first embodiment.

FIG. 3 shows metadata written in XML for video content, which is an example of multimedia content. The details of the metadata will be described.

Metadata is described from a position 3-*a*. Since data written in such an XML format may include information about other than metadata, the description in the position 3-*a* is provided for distinction from the other information. The end of the description of the metadata is written in a position 3-*y*. This shows that the metadata is provided in an area from a position 3-*b* to a position 3-*x*.

As the details of the metadata, to begin with, a metadata-provided segment is designated in the position 3-*b*. The metadata-provided segment from 0 hours, 2 minutes, 12 seconds to 0 hours, 4 minutes, 34 seconds in the video content is written in the position 3-*b*, and the details of the metadata provided to the metadata-provided segment are written from the position 3-*b*.

The end of the metadata-provided segment is written in the position 3-*x*. This shows that the metadata is provided in a segment up to a position 3-*w*.

A description about a dominant color of a moving image part of the video content in the metadata-provided segment is provided as metadata in an area from a position 3-*c* to a position 3-*i*. The start of the description of the metadata indicating the dominant color is written in the position 3-*c* and the end of the description of the metadata is written in the position 3-*i*.

The dominant color is written in RGB levels in a position 3-*h*. The dominant color is used for retrieval in the video content and is written as a type of metadata. Meta-metadata according to the present invention is provided in an area from a position 3-*d* to a position 3-*g*. The start of the description of the meta-metadata is written in the position 3-*d* and the end of the description of the meta-metadata is written in the position 3-*g*.

The details of the meta-metadata are provided in the position 3-*e*. The meta-metadata indicates that the reliability of the metadata indicating the dominant color is reduced to 30% due to an operation of color change as an editing operation in the metadata-provided segment. Similarly, a description indicating that the reliability of the metadata indicating the dominant color is reduced to 0%, that is, there is no reliability of the metadata, due to cut and paste in video editing in the metadata-provided segment is provided in a position 3-*f*.

Metadata indicating a dialog provided in the metadata-provided segment is provided in an area from a position 3-*j* to a position 3-*o*. The structure of the description is the same as in the structure of the description about the dominant color. "Hello", which is the details of the dialog, is written in a position 3-*n*. Meta-metadata according to the present invention provided in a position 3-*l* indicates that the metadata indicating the dialog becomes unreliable due to a change in audio information of the video content in the metadata-provided segment.

Similarly, a description about a photographed object of a moving image part of the video content in the metadata-provided segment is provided as metadata in an area from a position 3-*p* to the position 3-*w*. A description indicating that a person is photographed in the moving image in the metadata-provided segment and that the person's name is "Suzuki Ichiro" is provided in an area from a position 3-*t* to a position 3-*v* as metadata of the photographed object. Meta-metadata indicating that no operation changes the reliability of the metadata is provided in a position 3-*r*.

According to the present invention, metadata is provided to content, such as a moving image, and at the same time, a property of the metadata is provided as meta-metadata, so that each apparatus can use both the metadata and meta-metadata. Thus, each piece of content includes meta-metadata, which is a redundant part. However, if the content is edited and processed, use of information of the meta-metadata enables each apparatus to determine whether or not the metadata is usable for the edited and processed content. Also, even an apparatus that cannot recognize the details of the metadata can perform such determination.

Furthermore, since such determination processing is performed in each apparatus, the processing operation can be decentralized. In other words, processing for metadata is determined in accordance with meta-metadata for the metadata in decentralized processing apparatuses. Accordingly, although there is no central processing part, processing can be decentralized.

Figure 4:
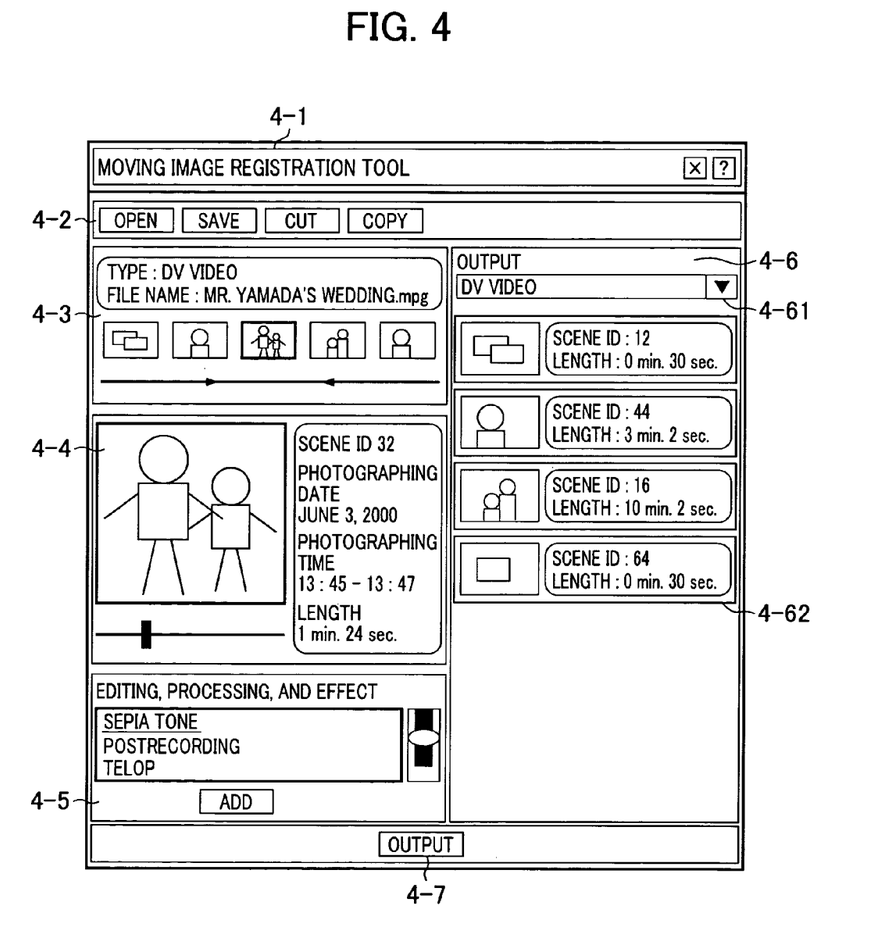
FIG. 4 shows a state in which editing and processing is being performed on video content in the information processing apparatus according to the first embodiment.

FIG. 4 shows a state in which editing and processing of video data is actually performed for video content. FIG. 4 shows an example of display on the CRT 20 using the CRTC 19 and the CG 21 shown in FIG. 1 in a case where a window system is used.

A part 4-1 is called a title bar and is provided for performing control of the entire window, such as moving, changing the size, and the like. A part 4-2 is called a tool bar and is provided for easily calling up main functions in the window.

A part 4-3 is provided for selecting a moving image scene and a still image to be edited and processed. In FIG. 4, an operation for scenes in a moving image file named "Mr. Yamada's Wedding.mpg" recorded using a video camera is shown.

A desired scene can be selected by designating a desired segment of the moving image by operating a slider in a tab using an input device, such as the KB 16 shown in FIG. 1. A picture surrounded by bold lines in the part 4-3 is a first one shot (one frame) of the selected scene. A picture of the preceding and following scenes and the like can be viewed in a similar manner. Accordingly, a user can select a desired segment of video content for editing and processing as one scene.

A part 4-4 is provided for playing and viewing the scene selected in the part 4-3. A desired shot and frame in the scene can be freely moved and viewed by operating a tab called a slider or the like. In a case where information about a photographing time of the scene and the like is provided, the information is displayed in the part 4-4. The user can acquire the details of the selected scene by viewing the part 4-4.

A part 4-5 is provided for instructing editing, processing, effect, and the like for the segment selected in the parts 4-3 and 4-4. Selecting any one in a field for editing, processing, and effect and pressing an add button causes a designated processing operation (editing, processing, and effect) to be performed and the processed video data is additionally registered in a part 4-62. Here, processing for metadata using meta-metadata according to the present invention is performed. The details of the processing will be described below.

A part 4-6 is provided for arranging the edited and processed video data to be displayed as video data. The video data to be output is stored in a state in which the video data is provided with metadata and meta-metadata as video content usable in the apparatus. A part 4-61 is provided for designating an output format, and the part 4-62 is provided for arranging video data created in the parts 43, 4-4, and 4-5. Here, the order of the final video content can be designated and changed by changing the order of the video data.

A part 4-7 is provided for instructing to output the video data arranged in the part 4-6 as a piece of video content.

Figure 5:
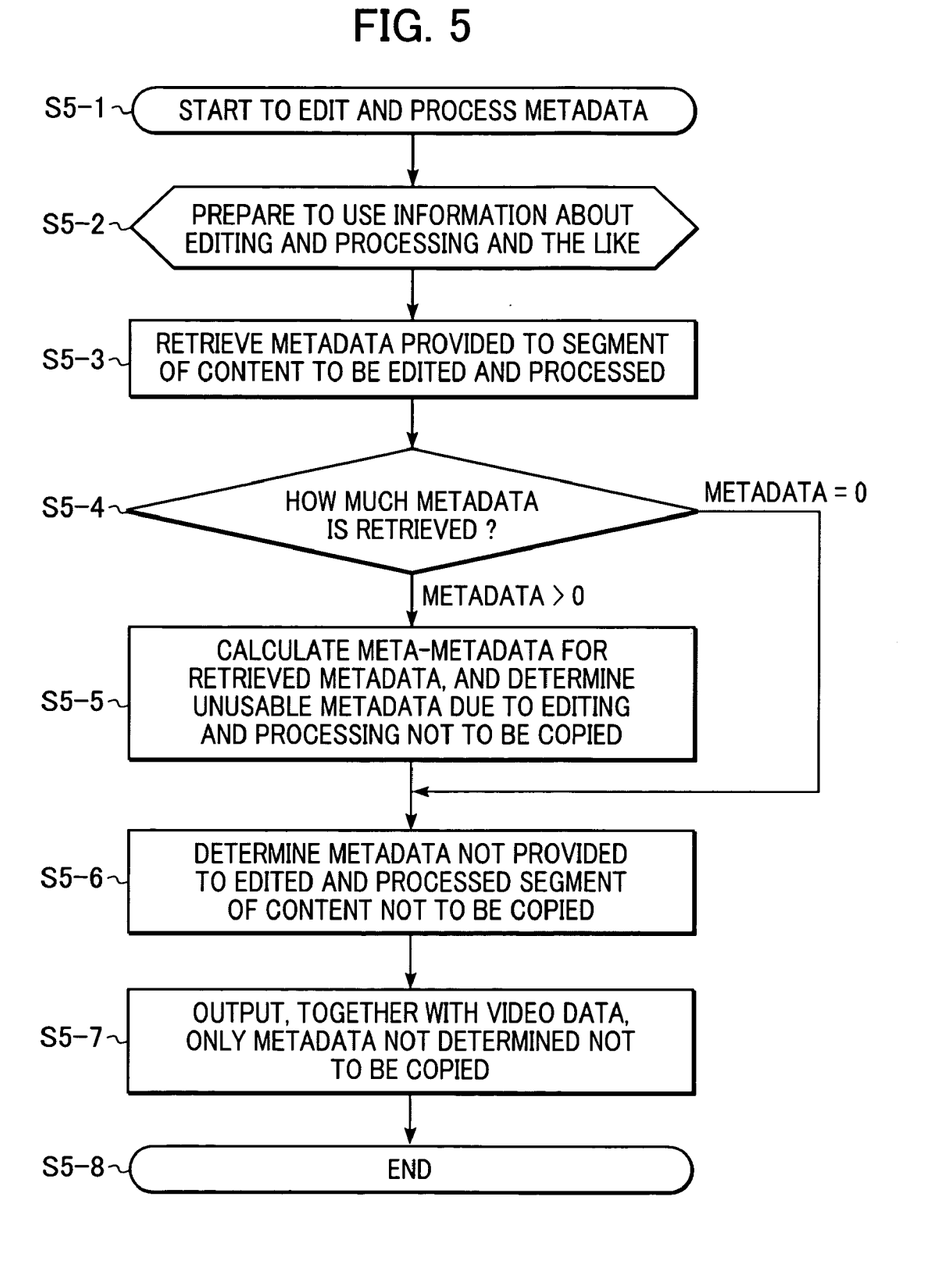
FIG. 5 is a flowchart showing the overview of the details and a procedure of a process performed for the metadata when a designated segment of the video content is edited and processed in the information processing apparatus according to the first embodiment.

FIG. 5 is a flowchart showing the overview of a procedure for a process when a segment of video content is designated as video data and an instruction for editing, processing and the like is provided. FIG. 5 shows an example of the process realized as computer programs. The programs may be operated partially or completely by an apparatus or a plurality of apparatuses. Alternatively, the programs may be operated in parallel at the same time.

The details of the process and the procedure shown in FIG. 5 will now be described. In the first embodiment, when a segment is designated as video data and an instruction for editing, processing, and the like is provided (when operation information about an editing and processing operation is received), the process is started in step S5-1.

Step S5-2 prepares to use metadata to be processed in the process, meta-metadata for the metadata, and information about the details of designated editing and processing.

Step S5-3 retrieves metadata provided to a segment of the content to be edited and processed.

Step S5-4 determines how much metadata is retrieved in step S5-3. If no metadata is retrieved, the process proceeds to step S5-6.

If metadata is retrieved, the process proceeds to Step S5-5. In step S5-5, the reliability of each piece of metadata is calculated in accordance with its corresponding meta-metadata and the details of editing and processing, and it is determined whether or not the metadata should be provided to the cut-out video data. If the metadata becomes unusable due to editing and processing, the metadata is determined not to be copied.

Figure 6:
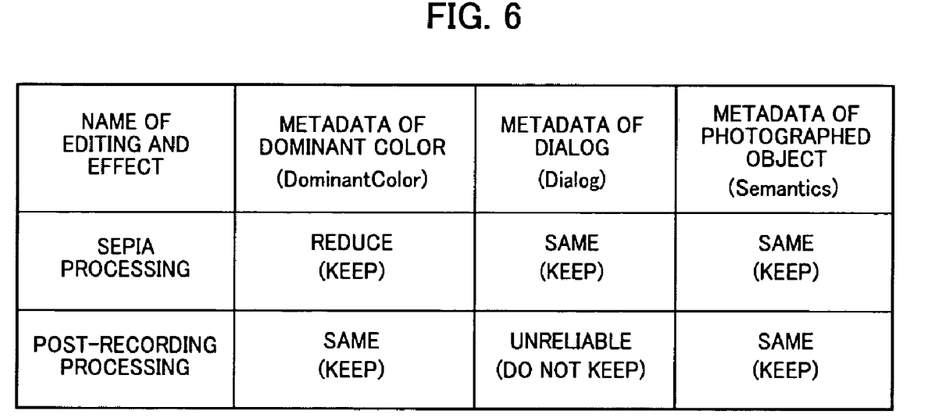
FIG. 6 shows calculation and determination results of each piece of the metadata when the metadata and the meta-metadata shown in FIG. 3 is processed in accordance with the procedure shown in FIG. 5 in the information processing apparatus according to the first embodiment.

FIG. 6 shows the results of whether or not to keep (copy) each piece of metadata, the results being obtained by calculating the reliability of each piece of the metadata, when sepia processing for changing into an antique color tone like an old photograph and post-recording processing for rewriting audio information are performed as editing and processing operations in a segment including the metadata and the meta-metadata shown in FIG. 3.

For sepia processing, although, generally, original metadata cannot be used as it is due to the entire color tone change, a pattern of contrast remains even after the processing. Thus, the metadata is not completely unreliable after the processing. Consequently, although the reliability of metadata of a dominant color is reduced, the metadata is determined to be "keep" (copy), as shown in FIG. 6. Also, since information about audio, a photographed object, and composition is not changed, metadata of a dialog and metadata of a photographed object are also determined to be "keep" (copy).

In contrast, for post-recording processing, although a moving image part is not changed, a dialog is changed or eliminated. Thus, metadata of the dialog cannot be used. Consequently, the metadata of the dialog is determined to be "do not keep" (do not copy). Since metadata of a dominant color and metadata of a photographed object are reliable and usable, each piece of the metadata is determined to be "keep" (copy).

As described above, depending on the details of editing and processing, metadata is determined to be usable or unusable. Also, depending of the type of editing and processing, a value pattern and characteristics of metadata remain to some extent and the metadata can thus be utilized to some extent. In the first embodiment, even in such a case, determination of whether or not to copy metadata can be performed in accordance with the reliability.

Any procedure for determining whether or not to be usable in accordance with the calculated reliability is possible. In the first embodiment, the calculated reliability of metadata is compared with a predetermined reliability. If the calculated reliability of the metadata is greater than or equal to the predetermined reliability, the metadata is determined to be usable.

Referring back to FIG. 5, step S5-6 determines metadata not provided in the segment cut out for editing and processing not to be copied so that the metadata is not kept in the cut-out video data.

Step S5-7 provides only metadata that is determined to be kept in the segment of the video data cut out for editing and processing to the cut-out video data in accordance with the determination performed in steps S5-5 and S5-6. The process is ended in step S5-8.

As is clear from the above description, according to the first embodiment, if an operation, such as editing and processing, is performed on multimedia content provided with metadata, metadata that becomes unusable after editing and processing can be avoided from being copied to the multimedia content. Consequently, metadata can be correctly used for edited multimedia content.

Also, for determination of usability of metadata, since information about the reliability of metadata after editing and processing is written in meta-metadata, even an apparatus that cannot recognize the details of metadata can determine whether or not to copy the metadata to edited multimedia content in accordance with the reliability of the metadata.

Second Embodiment

In the first embodiment, a segment of video content is designated in order to perform editing and processing. For some types of metadata, the usability of metadata, in other words, the reliability of metadata after processing may be changed only by such an operation.

For example, if only a part of a metadata-provided segment is designated as a segment of video content to be edited and processed, metadata of a dominant color and metadata of a dialog becomes unusable.

In such a case, however, metadata of a photographed object remains usable. Thus, in a case where a part of video content is designated as a segment to be edited and processed, descriptions indicating that the reliability of the metadata of the dominant color and the metadata of the dialog is reduced to 0% are written in corresponding meta-metadata. Also, a description indicating that the reliability of the metadata of the photographed object is not changed is written in meta-metadata for the metadata of the photographed object. As a result of this, unusable metadata is prevented from being copied to processed multimedia content.

Also, for some types of metadata, the usability may be changed by the way of cutting out a front or back part. In such a case, however, using meta-metadata in which a change in the reliability of metadata due to such an operation is recorded enables calculation and determination of the usability of the metadata, as in the first embodiment.

Third Embodiment

Although a change in the reliability of metadata due to an operation, such as editing, is written directly as meta-metadata in the first and second embodiments, the present invention is not limited to this. A storing destination for information about a change in the reliability of metadata due to editing may be written. A third embodiment of the present invention will now be described with reference to FIG. 7.

Figure 7:
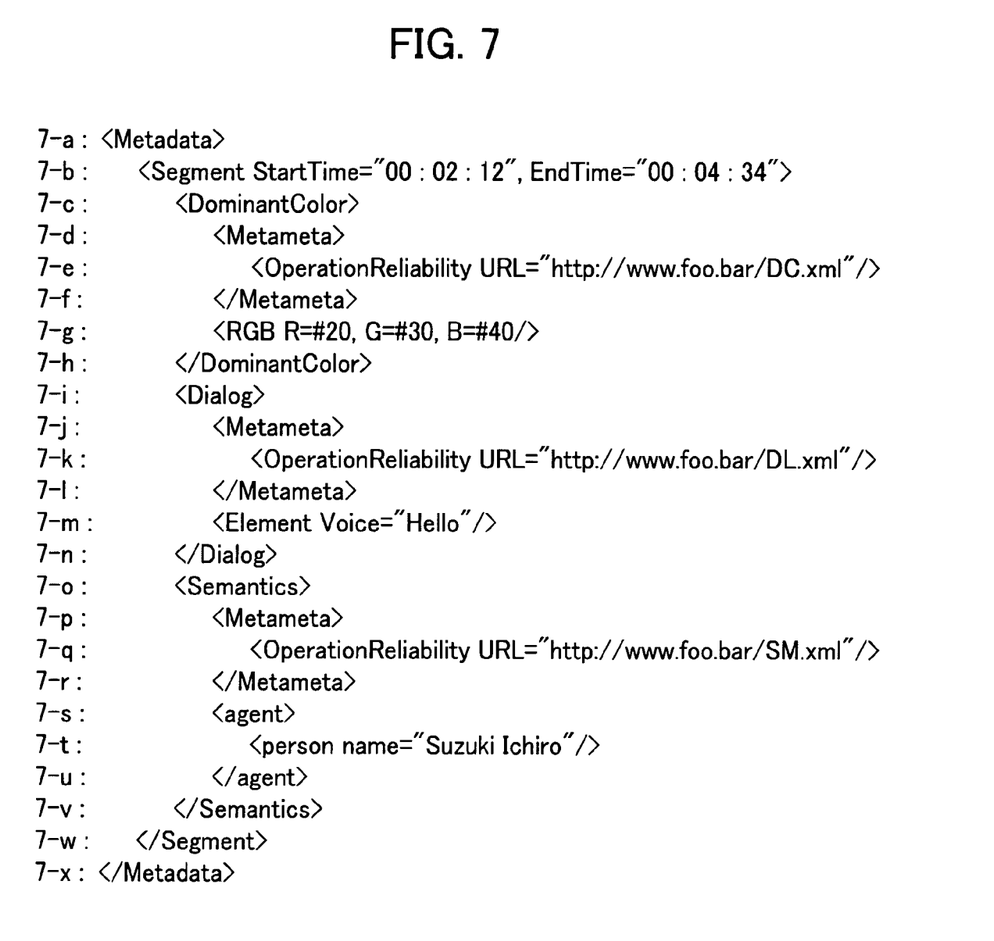
FIG. 7 shows data written in XML, which is an example of metadata and meta-metadata used in an information processing apparatus according to a third embodiment of the present invention.

FIG. 7 shows metadata written in XML for video content. The details of the metadata will be described.

Metadata is described from a position 7-*a*. Since data written in such an XML format may include information other than about metadata, the description in the position 7-*a* is provided for distinction from the other information. The metadata is provided in an area from a position 7-*b* to a position 7-*x*.

As the details of the metadata, to begin with, a metadata-provided segment is designated in the position 7-*b*. The metadata-provided segment from 0 hours, 2 minutes, 12 seconds to 0 hours, 4 minutes, 34 seconds in the video content is written in the position 7-*b*, and the details of the metadata provided to the metadata-provided segment are written from the position 7-*b*. The end of the metadata-provided segment is written in the position 7-*w*. This shows that the metadata is provided in a segment up to a position 7-*v*.

A description about a dominant color of a moving image part of the video content in the metadata-provided segment is provided as metadata in an area from a position 7-*c* to a position 7-*h*. The start of the description of the metadata indicating the dominant color is written in the position 7-*c* and the end of the description of the metadata is written in the position 7-*h*.

The dominant color is written in RGB levels in a position 7-*g*. The dominant color is used for retrieval in the video content and is written as a type of metadata. Meta-metadata according to the present invention is written in an area from a position 7-*d* to a position 7-*f*. The start of the description of the meta-metadata is written in the position 7-*d* and the end of the description of the meta-metadata is written in the position 7-*f*.

The details of the meta-metadata is written in the position 7-*e*. A URL that stores information necessary for acquiring a change in the reliability of the metadata due to editing and processing in the metadata-provided segment of the video content and that functions as identification when the change of the reliability is acquired via a network is written in the position 7-*e*. In the present invention, information written here is not limited to a URL. Any type of information may be written as long as a storing destination for information about a change in the reliability of metadata is written.

Metadata indicating a dialog provided in the metadata-provided segment is provided in an area from a position 7-*i* to a position 7-*n*. The structure of the description is the same as in the structure of the description about the dominant color. "Hello", which is the details of the dialog, is written in a position 7-*m*. Meta-metadata according to the present invention is provided in a position 7-*k*. Information necessary for acquiring information about a change in the reliability of the metadata due to editing and processing performed in the metadata-provided segment of the video content is written by URL in the position 7-*k*.

Similarly, a description about a photographed object of a moving image part of the video content in the metadata-provided segment is provided as metadata in an area from a position 7-*o* to the position 7-*v*. A description indicating that a person is photographed in the moving image in the metadata-provided segment and that the person's name is "Suzuki Ichiro" is provided in an area from a position 7-*s* to a position 7-*u* as metadata of the photographed object. Information necessary for acquiring information about a change in the reliability of the metadata due to editing and processing performed in the metadata-provided segment of the video content is written by URL in a position 7-*q* as meta-metadata according to the present invention.

As is clear from the above description, writing a storing destination for information about a change in the reliability of metadata due to editing as meta-metadata allows advantages similar to those of the first embodiment.

Fourth Embodiment

A fourth embodiment of the present invention is characterized in that operation information about an operation, such as editing and processing, performed on multimedia content is added as an operation record. A specific example will now be described.

Figure 8:
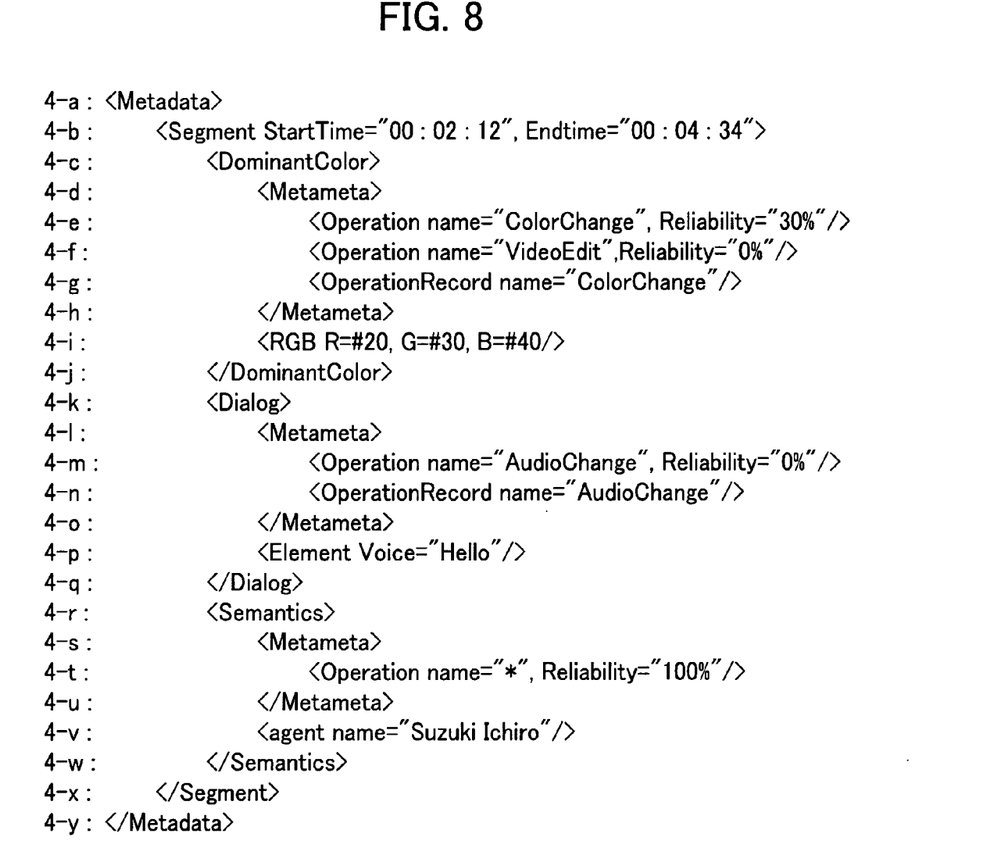
FIG. 8 shows data written in XML, which is an example of metadata and meta-metadata used in an information processing apparatus according to a fourth embodiment of the present invention.

FIG. 8 shows metadata written in XML for video content, which is an example of multimedia content. The details of the metadata will be described.

Metadata is described from a position 4-*a*. Since data written in such an XML format may include information about other than metadata, the description in the position 4-*a* is provided for distinction from the other information. The end of the description of the metadata is written in a position 4-*y*. This shows that the metadata is provided in an area from a position 4-*b* to a position 4-*x*.

As the details of the metadata, to begin with, a metadata-provided segment is designated in the position 4-*b*. The metadata-provided segment from 0 hours, 2 minutes, 12 seconds to 0 hours, 4 minutes, 34 seconds in the video content is written in the position 4-*b*, and the details of the metadata provided to the metadata-provided segment are written from the position 4-*b*.

The end of the metadata-provided segment is written in the position 4-*x*. This shows that the metadata is provided in a segment up to a position 4-*w*.

A description about a dominant color of a moving image part of the video content in the metadata-provided segment is provided as metadata in an area from a position 4-*c* to a position 4-*j*. The start of the description of the metadata indicating the dominant color is written in the position 4-*c* and the end of the description of the metadata is written in the position 4-*j*.

The dominant color is written in RGB levels in a position 4-*i*. The dominant color is used for retrieval in the video content and is written as a type of metadata. Meta-metadata according to the present invention is written in an area from a position 4-*d* to a position 4-*h*. The start of the description of the meta-metadata is written in the position 4-*d* and the end of the description of the meta-metadata is written in the position 4-*h*.

The details of the meta-metadata are provided in the position 4-*e*. The meta-metadata indicates that the reliability of the metadata indicating the dominant color is reduced to 30% due to an operation of color change as an editing operation in the metadata-provided segment. Similarly, a description indicating that the reliability of the metadata indicating the dominant color is reduced to 0%, that is, there is no reliability of the metadata, due to cut and paste in video editing in the metadata-provided segment is provided in a position 4-*f*.

A description not provided before an operation, such as editing and processing, performed on the multimedia content is provided in a position 4-*g* as a part of the meta-metadata. In other words, operation information about the editing and processing is added as an operation record when the editing and processing operation is performed on the multimedia content. In the fourth embodiment, a description indicating that an operation of "ColorChange" (operation of changing a color) has been performed as an editing and processing operation is provided.

Metadata indicating a dialog provided in the metadata-provided segment is provided in an area from a position 4-*k* to a position 4-*q*. The structure of the description is the same as in the structure of the description about the dominant color. "Hello", which is the details of the dialog, is written in a position 4-*p*. Meta-metadata provided in a position 4-*m* indicates that the metadata becomes unreliable due to a change in audio information of the video content in the metadata-provided segment.

Also, an operation record indicating that an operation of "AudioChange" (operation of changing audio) has been performed is provided in a position 4-*n*, as in the operation record of the dominant color.

Similarly, a description about a photographed object of a moving image part of the video content in the metadata-provided segment is provided as metadata in an area from a position 4-*r* to the position 4-*w*. A description indicating that a person is photographed in the moving image in the metadata-provided segment and that the person's name is "Suzuki Ichiro" is provided in an area from a position 4-*s* to a position 4-*v* as metadata of the photographed object. Meta-metadata indicating that no operation changes the reliability of the metadata is provided in a position 4-*t*.

Figure 9:
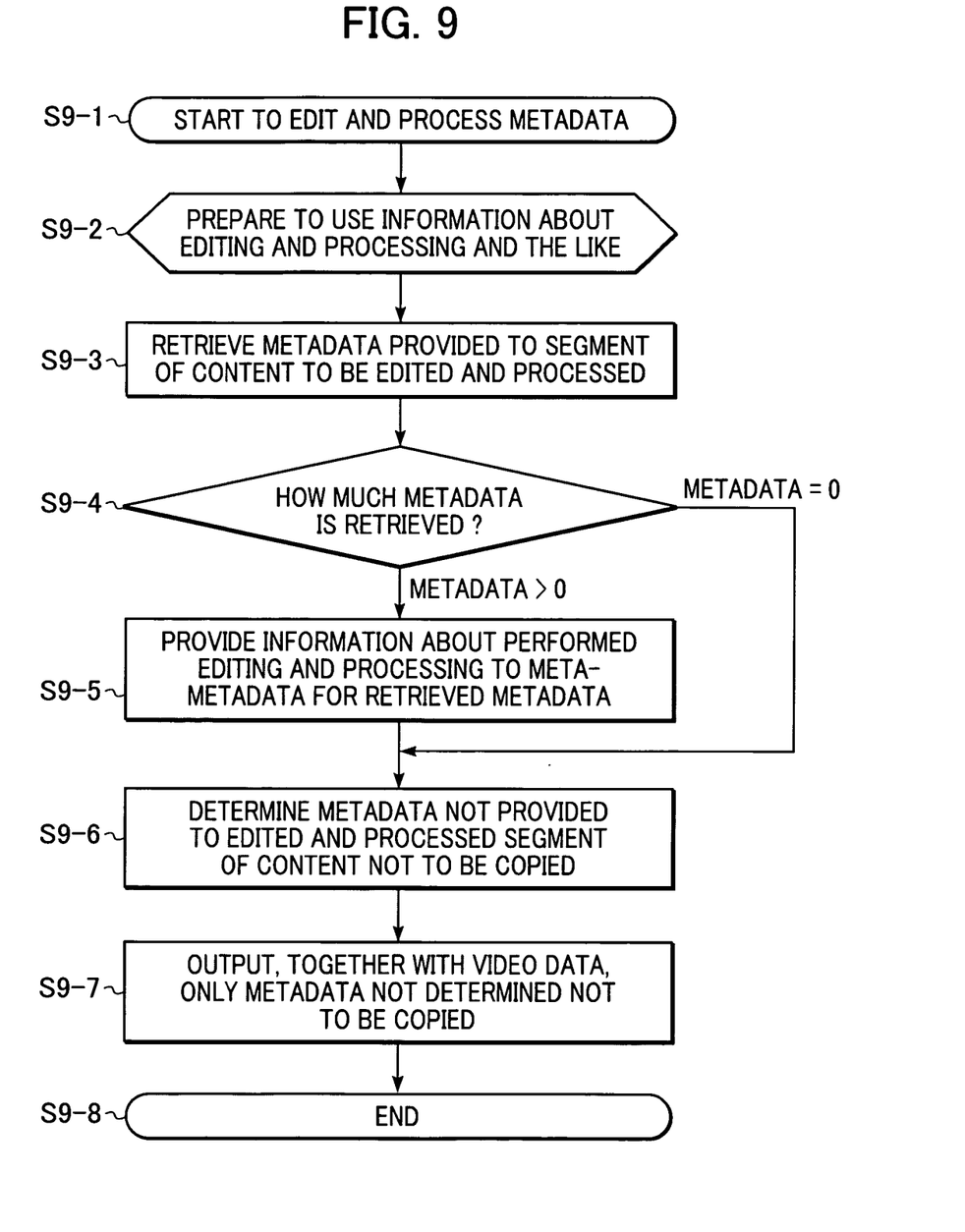
FIG. 9 is a flowchart showing the overview of the details and a procedure of a process performed for the metadata when a designated segment of video content is edited and processed in the information processing apparatus according to the fourth embodiment.

FIG. 9 is a flowchart showing the overview of a procedure for a process when a segment of video content is designated as video data and an instruction for editing, processing and the like is provided. FIG. 9 shows an example of the process realized as computer programs. The programs may be operated partially or completely by an apparatus or a plurality of apparatuses. Alternatively, the programs may be operated in parallel at the same time.

The details of the process and the procedure shown in FIG. 9 will now be described. In the fourth embodiment, when a segment is designated as video data and an instruction for editing, processing and the like is provided (when operation information about an editing and processing operation is received), the process is started in step S9-1.

Step S9-2 prepares to use metadata to be processed in the process, meta-metadata for the metadata, and information about the details of designated editing and processing.

Step S9-3 retrieves metadata provided in a segment of the content to be edited and processed.

Step S9-4 determines how much metadata is retrieved in step S9-3. If no metadata is retrieved, the process proceeds to step S9-6.

Step S9-5 adds the details of the editing and processing operation, as an operation record, to meta-metadata in the metadata retrieved by step S9-4. The operation records provided in the positions 4-*g* and 4-*n* in FIG. 8 are added in step S9-5.

Step S9-6 determines metadata not provided in the segment cut out for editing and processing not to be copied so that the metadata is not kept in the cut-out video data.

Step S9-7 provides only metadata that is determined to be kept in the segment of the video data cut out for editing and processing to the cut-out video data in accordance with the determination performed in steps S9-5 and S9-6. The process is ended in step S9-8.

A process for retrieving metadata will now be described with reference to FIG. 10. In the fourth embodiment, when a segment is designated as video data and an instruction for an operation, such as retrieval, is provided, the process is started in step S6-1. Although an example of retrieval is described here, any type of operation for metadata is possible.

Step S6-2 prepares for retrieval of metadata to be processed and meta-metadata for the metadata.

Step S6-3 retrieves appropriate metadata in accordance with a segment and the type of metadata designated by retrieval conditions.

Step S6-4 determines how much candidate metadata for retrieval results is found in step S6-3. If no candidate metadata is found, the process proceeds to step S6-6.

If candidate metadata for the retrieval results is found, the process proceeds to Step S6-5 to determine the usability of each piece of the metadata by calculating the reliability of the metadata in accordance with the corresponding meta-metadata. Metadata that is determined to be unusable is excluded from the candidate for the retrieval results.

The details of step S6-5 will now be explained with reference to FIG. 8. In a case where multimedia content includes the metadata and the meta-metadata shown in FIG. 8, a description indicating that the reliability of metadata of a dominant color is reduced to 30% due to an operation of color change is provided as meta-metadata in the position 4-*e* and a description indicating that the operation of the color change has been performed is provided as an operation record in the position 4-*g*.

In step S6-5, first, the reliability of the metadata at that time, in other words, the reliability of the metadata after performing color change is calculated in accordance with the operation record provided in the position 4-g and with the information about the change in the reliability of the metadata provided in the position 4-e.

Then, Step S6-5 also determines the usability of the metadata in accordance with the calculated reliability. This determination is performed by comparing the calculated reliability with predetermined threshold reliability. Metadata that is determined to be unusable is excluded from the retrieval results.

Similarly, a description indicating that the reliability of metadata indicating a dialog is reduced to 0% due to an operation of audio change is provided as meta-metadata in the position 4-m in FIG. 8. Thus, although the reliability of the metadata indicating the dialog is not changed due to the operation of the color change, the reliability of the metadata indicating the dialog is reduced to 0% due to the operation of the audio change. Since the operation record indicating that the audio change has been performed is provided as the meta-metadata in the position 4-n in FIG. 8, the reliability of the metadata indicating the dialog is calculated to be 0% and the metadata is determined to be unusable. As a result of this, the metadata is excluded from the retrieval results.

Furthermore, since the metadata indicating the photographed object does not include meta-metadata about an operation record in FIG. 8, the metadata of the photographed record is output as a retrieved result.

As a more specific example, processing for retrieving metadata in video content on which sepia processing, that is, an operation of color change for changing into an antique color tone like an old photograph and post-recording processing for rewriting audio information are performed will be described.

A case where the metadata of the dominant color, the metadata of the dialog, and the metadata of the photographed object shown in FIG. 8 are retrieved in accordance with predetermined conditions will be described.

For sepia processing, although, generally, original metadata cannot be used as it is due to the entire color tone change, a pattern of contrast remains even after the processing. Thus, the metadata of the dominant color is not completely unreliable even after the processing and the reliability of the metadata after the processing is 30%. Accordingly, the metadata of the dominant color is determined to be usable. Also, since information about audio, a photographed object, and composition is not changed due to sepia processing, the metadata of the dialog and the metadata of the photographed object are also determined to be usable. Thus, for the video content subjected to the sepia processing, metadata of the dominant color, the metadata of the dialog, and the metadata of the photographed object are output as retrieval results.

In contrast, for post-recording processing, although a moving image part is not changed, a dialog is changed or eliminated. Thus, the reliability of the metadata of the dialog is reduced to 0% and the metadata is thus determined to be unusable. Since information about a color tone, a photographed object, and composition is not changed due to the post-recording processing, the metadata of the dominant color and the metadata of the photographed object are determined to be usable. Thus, for the video content subjected to the post-recording processing, the metadata of the dominant color and the metadata of the photographed object are output as the retrieved results.

As described above, depending on the details of editing and processing, metadata in video content is determined to be usable or unusable. Also, depending of the type of editing and processing, a value pattern and characteristics of metadata remain to some extent and the metadata can thus be utilized to some extent. In the fourth embodiment, even in such a case, metadata can be excluded from retrieval results in accordance with the reliability.

Figure 10:
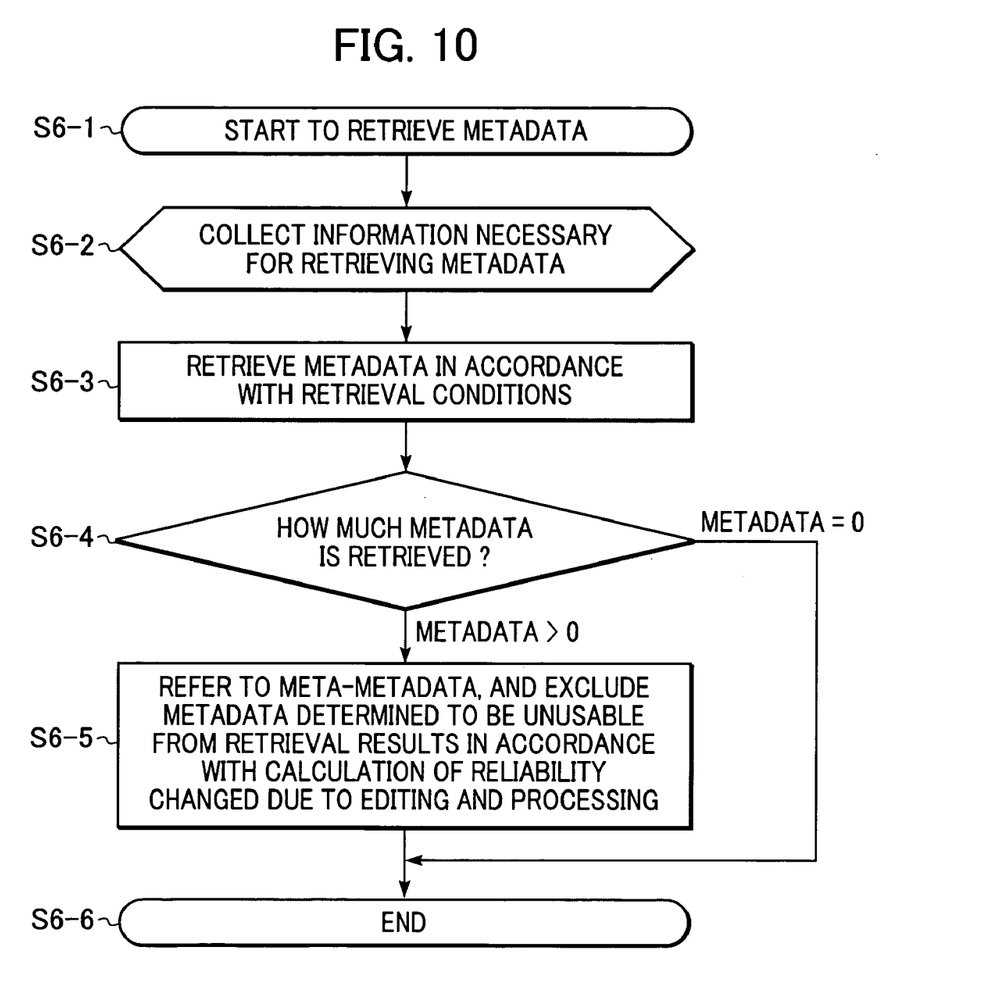
FIG. 10 is a flowchart showing a process for retrieving metadata in video content in the information processing apparatus according to the fourth embodiment.

Referring now back to FIG. 10, the process is ended in step S6-6.

As is clear from the above description, according to the fourth embodiment, operation information can be provided as an operation record in meta-metadata when an operation, such as editing and processing, is performed on multimedia content including meta-metadata in which a change in the reliability of metadata due to editing and processing is written.

Thus, when metadata is retrieved in edited and processed multimedia content, the reliability of the retrieved metadata is calculated, metadata with low reliability is determined to be unusable, and the unusable metadata is excluded from retrieval results. In other words, metadata can be correctly used in edited multimedia content.

Also, by combining the fourth embodiment and the embodiments described above, when a segment of video content is designated and such an operation is written as an operation record in meta-metadata, metadata of a dominant color and metadata of a dialog are excluded from retrieval results if retrieval of the metadata is performed in the processed video content.

Fifth Embodiment

Although a change in the reliability of metadata due to an operation, such as editing, is written directly as meta-metadata in the fourth embodiment, the present invention is not limited to this. A storing destination for information about a change in the reliability of metadata due to editing may be written.

Writing a storing destination for information about a change in the reliability of metadata due to editing as meta-metadata allows advantages similar to those of the fourth embodiment.

Other Embodiments

The present invention is applicable to a system including a plurality of apparatuses, such as a host computer, an interface apparatus, a reader, and a printer. The present invention is also applicable to an apparatus, such as a copying machine or a facsimile machine.

It is obvious that the object of the present invention can also be achieved by supplying a storage medium on which program codes of software for realizing the functions of the embodiments described above are recorded to a system or an apparatus and by causing a computer (or a CPU or an MPU) of the system or the apparatus to read and execute program codes stored in the storage medium.

In this case, the program codes themselves read from the storage medium realize functions of the embodiments described above. Thus, the storage medium that stores the program codes constitutes the present invention.

The storage medium for supplying the program codes may be, for example, a floppy disk, a hard disk, an optical disk, a magnetic optical disk, a CD-ROM, a CD-R, a magnetic tape, a nonvolatile memory card, a ROM, and the like.

It is also obvious that the functions of the embodiments described above can be realized not only by executing the read program codes by the computer but also by performing part or all of the actual processing by an operating system (OS) or the like running on the computer on the basis of instructions of the program codes.

It is also obvious that the functions of the embodiments described above can also be realized by performing part or all of the actual processing by a CPU or the like arranged in a function extension board of the computer or a function extension unit connected to the computer on the basis of instructions of program codes read from the storage medium after the program codes are written in a memory of the function extension board or the function extension unit.

As described above, according to the present invention, even if multimedia content is edited, metadata can be correctly used for the edited multimedia content, irrespective of the type of metadata.

Also, even if editing is performed on multimedia content including metadata, use of the correct metadata in the edited multimedia content is possible.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for editing multimedia content including metadata, the method comprising:
   receiving operation information about an editing operation;
   adding the operation information to the metadata;
   writing the reliability information to the metadata;
   reading the operation information and reliability information from the metadata; and
   determining, in accordance with the operation information and the reliability information, whether the metadata is usable for edited multimedia content edited by the editing operation,
   wherein, if the metadata is determined to be usable, the metadata is added to the edited multimedia content.

2. A method according to claim 1, wherein the reliability information indicates the reliability of the metadata.

3. A method according to claim 1, wherein the reliability information is based on the operation information.

4. A method according to claim 1, wherein determining whether the metadata is usable includes comparing the reliability information with predetermined reliability information.

5. Computer-executable process steps stored on a computer-readable storage medium, the computer-executable process steps causing a computer to execute the method of claim 1.

6. An electronic device for editing multimedia content including metadata, the electronic device comprising:
   a memory, comfigured to store computer-executable instructions; and
   a processor for executing the computer-excutable instructions stored in the memory, the computer-executable instructions comprising instructions for:
      receiving operation information about an editing operation;
      adding the operation information to the metadata;
      writing reliability information to the metadata;
      reading the operation information and reliability information from the metadata; and
      determining, in accordance with the operation information and the reliability information, whether the metadata is usable for edited multimedia content edited by the editing operation,
   wherein, if the metadata is determined to be usable, the metadata is added to the edited multimedia content.

7. An electronic device according to claim 6, wherein the reliability information indicates the reliability of the metadata.

8. An electronic device according to claim 6, wherein the reliability information is based on the operation information.

9. An electronic device according to claim 6, wherein determining whether the metadata is usable includes comparing the reliability information with predetermined reliability information.

* * * * *